(12) United States Patent
Jordana et al.

(10) Patent No.: US 7,972,522 B2
(45) Date of Patent: *Jul. 5, 2011

(54) SLOTTED GUIDE STRUCTURE

(75) Inventors: Emmanuel Jordana, Grenoble (FR);
Jean-Marc Fedeli, Saint Egreve (FR);
Loubna El Melhaoui, Grenoble (FR)

(73) Assignee: Commissariat A L'Energie Atomique, Paris (FR)

( * ) Notice: Subject to any disclaimer, the term of this patent is extended or adjusted under 35 U.S.C. 154(b) by 746 days.

This patent is subject to a terminal disclaimer.

(21) Appl. No.: 11/982,139

(22) Filed: Oct. 31, 2007

(65) Prior Publication Data

US 2008/0099425 A1 May 1, 2008

(30) Foreign Application Priority Data

Oct. 31, 2006 (FR) ...................................... 06 54669

(51) Int. Cl.
*H01B 13/00* (2006.01)

(52) U.S. Cl. ................. 216/17; 216/37; 216/67; 385/15; 385/43; 385/50; 385/129; 385/10

(58) Field of Classification Search .................... 216/17, 216/37, 67; 385/15.39, 43, 50, 129, 130, 385/132
See application file for complete search history.

(56) References Cited

U.S. PATENT DOCUMENTS

| 4,473,598 | A * | 9/1984 | Ephrath et al. ............... 438/429 |
| 5,888,876 | A * | 3/1999 | Shiozawa et al. ............ 438/386 |
| 6,108,464 | A | 8/2000 | Foresi et al. |
| 6,228,691 | B1 * | 5/2001 | Doyle ........................... 438/149 |
| 6,391,214 | B1 | 5/2002 | Kovacic |
| 2003/0000918 | A1 | 1/2003 | Kheraj et al. |
| 2004/0077178 | A1 | 4/2004 | Yang et al. |
| 2005/0089291 | A1 | 4/2005 | Yamada |
| 2006/0037364 | A1 | 2/2006 | Chang et al. |
| 2006/0228074 | A1 | 10/2006 | Lipson et al. |
| 2007/0114628 | A1 | 5/2007 | Barrios et al. |

OTHER PUBLICATIONS

Virginia Semiconductor, The General Properties of Si, Ge, SiGe, SiO2 and Si3N4, Jun. 2002. pp. 1-5.*
V.R. Almeida et al.: "Guiding and Confining Light in Void Nanostructure", Optics Letters, Osa, Optical Society of America, Washington, DC, US, vol. 29, No. 11, Jun. 1, 2004, pp. 1209-1211.
T. Baehr-Jones et al.: "Optical Modulation and Detection in Slotted Silicon Waveguides", Optics Express, 13(14), pp. 5216-5226, 2005.

(Continued)

*Primary Examiner* — Duy-Vu N Deo
*Assistant Examiner* — Maki A Angadi
(74) *Attorney, Agent, or Firm* — Nixon Peabody LLP (57) ABSTRACT

The invention relates to a method for producing a slotted guide, in which:

a) a layer of a material having a refractive index less than that of silicon, for example Material having a refractive index less than that of silicon (26), is formed on an etching barrier layer (22), b) two parallel trenches are etched into said material having a refractive index less than that of silicon, with the etching barrier on said etching barrier layer, these two trenches being separated by a wall of said material having a refractive index less than that of silicon (36), c) the trenches thus made are filled with silicon (42, 44).

22 Claims, 12 Drawing Sheets

OTHER PUBLICATIONS

C.A. Barrios et al.: "Electrically driven silicon resonant light emitting device based on slot-waveguide", Optics Express Opt. Soc. America USA, vol. 13, No. 25, Dec. 12, 2005, pp. 10092-10101.

C.A. Barrios et al.: "High Performance All-Optical Silicon Microswitch", Electronic Letters Soc., vol. 40 No. 14, Jul. 8, 2004, pp. 862-863.

J.M. Fedeli, S. Laval: "Microphonique silicium pour connexions rapides sur circuit integre", Les Composants Electroniques, No. 9, Oct. 2002, pp. 62-67.

G. Vijaya Prakash et al.: "Linear and Nonlinear Optical Properties of Plasma-Enhanced Chemical-Vapour Deposition Grown Silicon Noncrystals", Journal of Modern Optics, vol. 49, No. 5-6, Sep. 3, 2001, pp. 719-720.

Q. Xu et al.: "Experimental Demonstration of Guiding and Confining Light in Nanometer-Size Low-Refractive-Index Material", Optics Letters, vol. 29, No. 14, Jul. 15, 2004.

French Preliminary Search Report, EP 07 11 9452, dated Dec. 19, 2007.

Weiss et al., "The Transmission Properties for Optical Waveguides in SIMOX Structures," Optical and Quantum Electronics, vol. 23, 1991, pp. 1061-1065.

Prieto et al., "Integrated Mach Zehnder Interferometer Based on ARROW Structures for Biosensor Applications," Sensors and Actuators, vol. B92, 2003, pp. 151-158.

Kim et al., "Influence of Hydrogen on SiO2 Thick Film Deposited by PECVD and FHD for Silica Optical Waveguide," Crystal Research and Technology, vol. 37, 2002, pp. 1257-1263.

T. Fujisawa et al., "Theoretical Investigation of Ultrasmall Polarization-Insensitive 1*2 Multimode Interference Waveguides Based on Sandwiched Structures," IEEE Photonics Technology Letters vol. 18, No. 11, Jun. 1, 2006, pp. 1246-1248.

G. Vijaya Prakash et al., "Nonlinear Optical Properties of Silicon Nanocrystals Grown by Plasma-Enhanced Chemical Vapor Deposition," Journal of Applied Physics, vol. 91, No. 7, 2002, pp. 4607-4610.

French Preliminary Search Report for French Application No. FR 0654670, dated Jun. 6, 2007.

Office Action in U.S. Appl. No. 11/982,140, dated Jul. 26, 2010.

Office Action in U.S. Appl. No. 11/982,140, mailed Feb. 16, 2011.

European Search Report for European Application No. 07119452.6, dated Jan. 4, 2008.

French Preliminary Search Report for French Application No. FR 0654669, dated May 31, 2007.

* cited by examiner

SLOTTED GUIDE STRUCTURE

CROSS-REFERENCE TO RELATED PATENT APPLICATION OR PRIORITY CLAIM

This application claims the benefit of a French Patent Application No. 06-54669, filed on Oct. 31, 2006, the disclosure of which is incorporated herein in its entirety by reference.

TECHNICAL FIELD AND PRIOR ART

This invention is located in the field of "Silicon Nanophotonics" (the field of guiding light in guides of nanometric dimensions), and relates primarily to optical interconnections on silicon chips and in particular the production of photonic logic gates.

Highly integrated optical functions can be produced on silicon. In a general approach, transmitters are used (integrated or added on, and electrically controlled), which are coupled with a set of guides which perform an optical function, either passively, or in response to an electrical command. These guides terminate at photodetectors which deliver the result of the optical function electrically.

The operation of a slotted guide implements propagation in a low-index medium and an index discontinuity which enables excellent containment of the light. This architecture has thus far enabled:

the conception of optical switches and light sources in photonic integrated circuits, as described in the articles by C. A. Barrios, Electronics Letters, 40, pp. 862-863, 2004 and C. A. Barrios et al, Optics Express, 13(25), pp. 10092-10101, 2005;

the production of compact photodetectors, as described in the article by T. Baehr-Jones et al, Optics Express, 13(14), pp. 5216-5226, 2005.

In this structure, the optical field is increased and contained in the slot, both geometrically and optically, all the more so as the slot is narrow and the refractive index contrast is high.

Figure 1A:
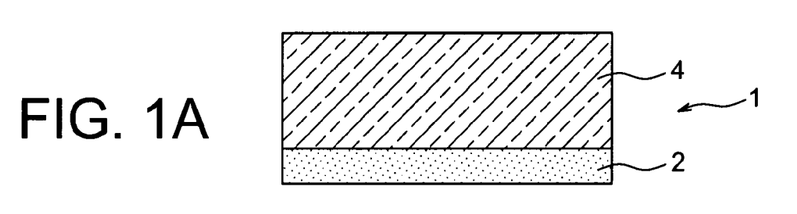
FIGS. 1A-1D show steps of a standard method for producing a slotted guide.
Figure 1B:
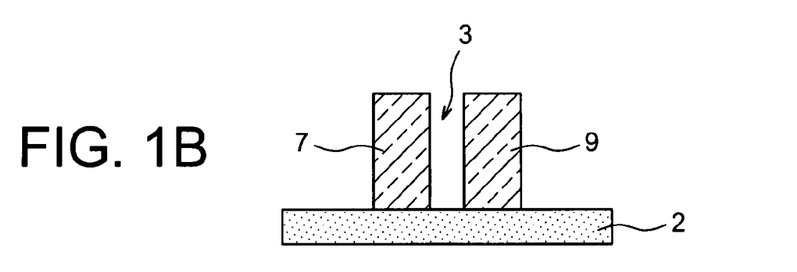
Figure 1C:
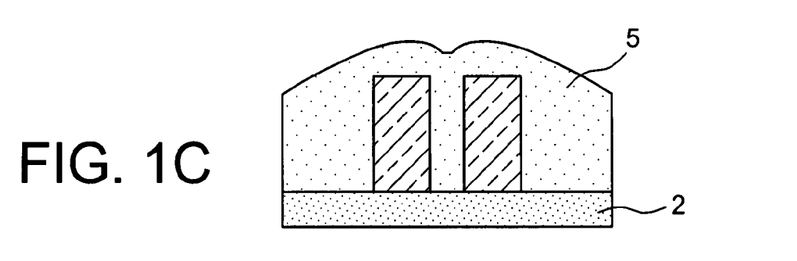
Figure 1D:
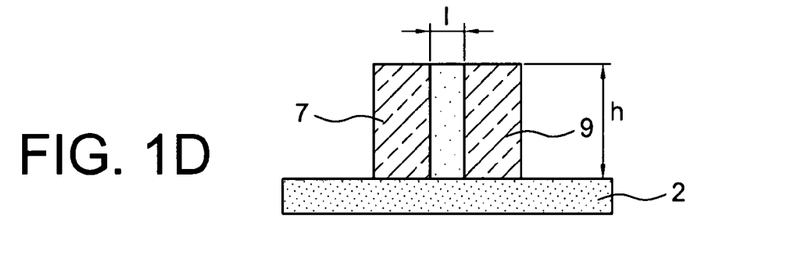

In order to integrate this material into the slotted guide, a manufacturing method is generated as shown in FIGS. 1A-1D. A slot 3 is etched (FIG. 1B) in a SOI substrate 1 (FIG. 1A, in which the references 2 and 4 designate a $SiO_2$ layer and a silicon layer, respectively). Two lateral walls 7, 9 made of silicon are thus formed, on either side of this slot. Next, filling with material having a refractive index less than that of silicon ($SiO_x$) 5 is carried out, as shown in FIG. 1C. A planarization and etching step results in the structure of FIG. 1D.

Figure 2:
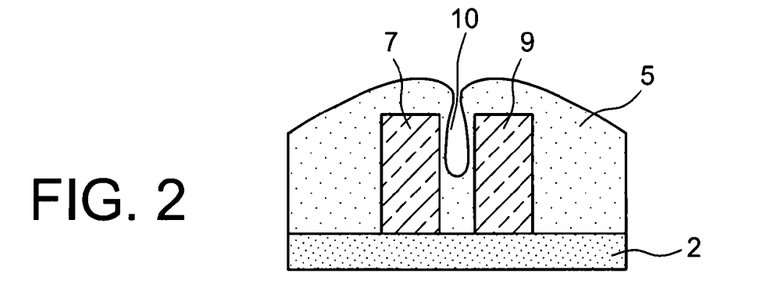
FIG. 2 shows the presence of an air bubble during a standard process for making a slotted guide.

However, no attempt at filling has thus far been concluded, in so far as a low PECVD deposition temperature does not allow the slot 3 to be filled. This problem exists in particular for a shape factor (equivalent to the ratio of the height h to the width 1 of the slot, see FIG. 1D) greater than 1.5. This manifests itself by the formation of a bubble 10 in the slot 3, degrading the performance of the guide, as shown in FIG. 2.

Sometimes, it is impossible to fill the slot. In this case, there is not only a bubble associated with a filling defect, but a filling defect.

For example, the following various PECVD depositions were tested: $SiO_2$ (with a $SiH_4$ source) at 480° C. and 350° C., $SiO_2$ (TEOS, tetraethyl orthosilicate) at 400° C. and 350° C. and Material having a refractive index less than that of silicon (with a $SiH_4/N_2O$ source) at 400° C.

Figure 3:
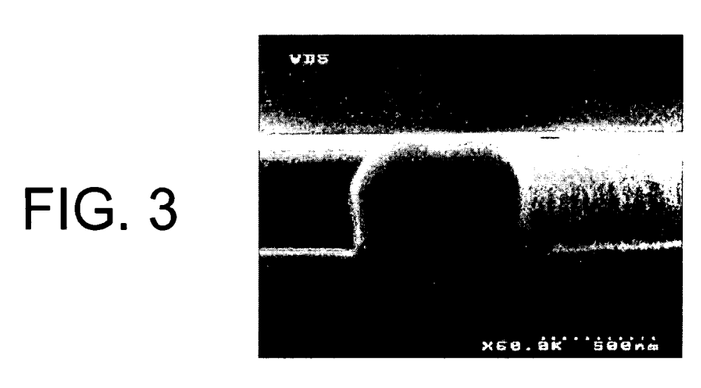
FIG. 3 is a sectional view with a SEM of a filling attempt with a standard process for making a slotted guide

As can be observed in FIG. 3, showing a sectional view of a slotted guide taken with a scanning electron microscope, the slot is not filled, and this is so regardless of the type of deposition or material. For each of the tests, an air bubble appears, created by the accumulation of the deposit on the upper portion of the silicon walls.

DISCLOSURE OF THE INVENTION

The invention proposes an alternative manufacturing method which makes it possible to avoid the difficult step of filling the slot.

The invention relates first of all to a method of producing a slotted guide, in which:

a layer of material having a refractive index less than that of silicon is formed on an etching barrier layer, two parallel trenches are etched into the layer of material having a refractive index less than that of silicon, etching being stopped at or on said etching barrier layer, these two trenches being separated by a wall of a material having a refractive index less than that of silicon, the trenches thus made are filled with silicon.

A material having a refractive index less than that of silicon can be silicon dioxide $SiO2$, or silicon nitride SiN, or non-stoichiometric $SiO_x$ (x<2).

In the case of non-stoichiometric $SiO_x$ (x<2), an annealing step is carried out to separate $SiO_x$ into two distinct phases, thus forming nanocristals of silicon in a matrix of $SiO2$. Preferably, the annealing step is carried out after formation of $SiO_x$ and before the trenches are etched.

According to the invention, a method is implemented which is the reverse of the known methods, by first depositing the material having a refractive index less than that of silicon on an unstructured plate. Then it is etched in the form of a wall. Next, the silicon can be deposited.

The material having a refractive index less than that of silicon can be obtained by LPCVD or PECVD.

The silicon used to fill the trenches can be in amorphous form (obtained by PECVD).

The etching barrier layer can be $SiO_2$.

According to another embodiment, the silicon used to fill the trenches can be in monocrystalline form; it is formed by epitaxial growth. The etching barrier layer can thus be made of silicon, this is the thinned surface layer of a SOI substrate, for example.

The material having a refractive index less than that of silicon can be eliminated from each side of the silicon formed in the trenches on either side of the wall of material having a refractive index less than that of silicon.

DETAILED DESCRIPTION OF PARTICULAR EMBODIMENTS

A first manufacturing method according to the invention will be described in connection with FIGS. 4A-4G.

This method is particularly suited to the case where the silicon of the slotted guide is in amorphous form.

In a first step, silica 22 (FIG. 4A) is produced (via deposition or thermal growth) on a silicon plate 20 (this can be a standard plate). This oxide is preferably rather thick (greater than 1 µm) in order to prevent losses induced by coupling with the substrate.

Figure 4A:
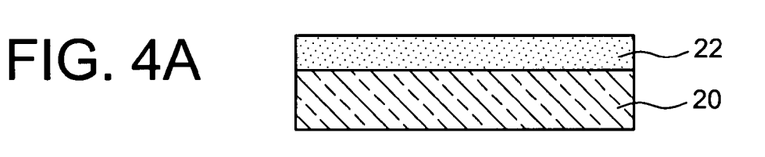
FIGS. 4A-4J are steps of a method according to the invention, using amorphous Si.
Figure 4B:
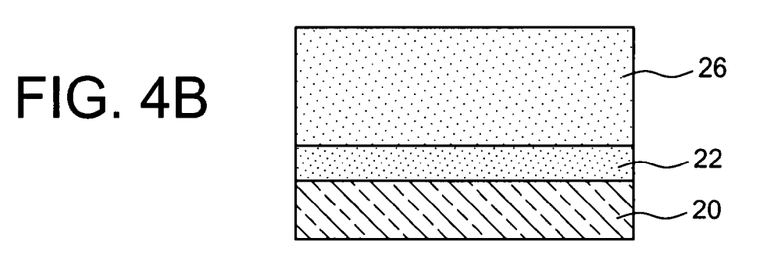

A layer 26 of material having a refractive index less than that of silicon, for example silicon dioxide SiO2 or silicon nitride SiN, or non-stoichiometric $SiO_x$ (x<2), is then deposited on the oxide layer 22 (FIG. 4B).

Figure 4C:
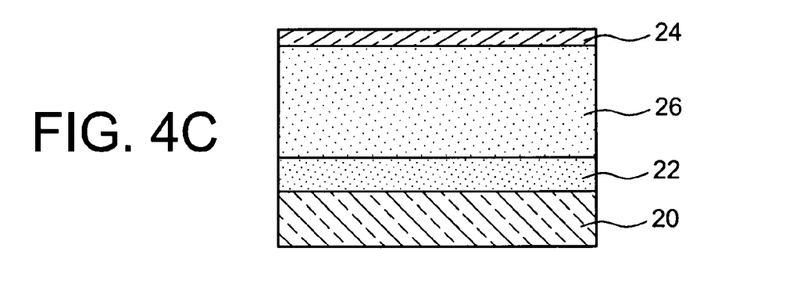
Figure 4D:
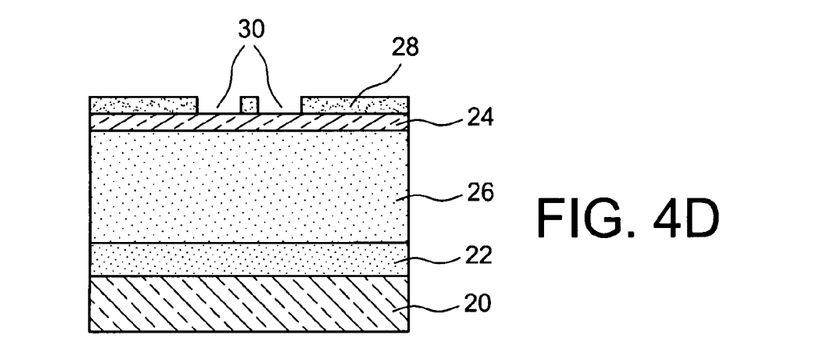

Next, a hard mask 24 is formed (FIG. 4C). SiN or SiC can be used for this mask, or a resin or even a metal, or amorphous carbon.

A positive photoresist 28 is next deposited on the hard mask layer 24. Openings 30 are formed in this resin (FIG. 4D) via lithography. For narrow openings, for example, electron beam lithography or 193-nm DUV photolithography can be used.

Figure 4E:
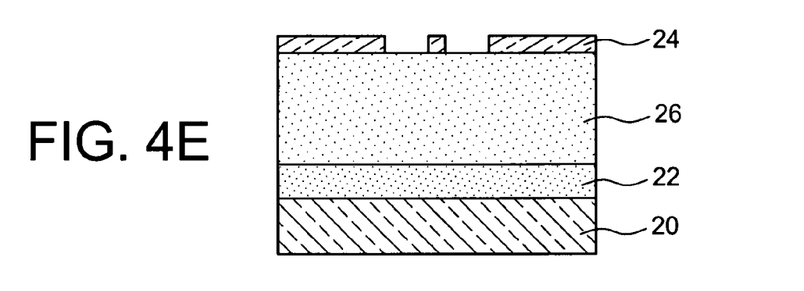
Figure 4F:
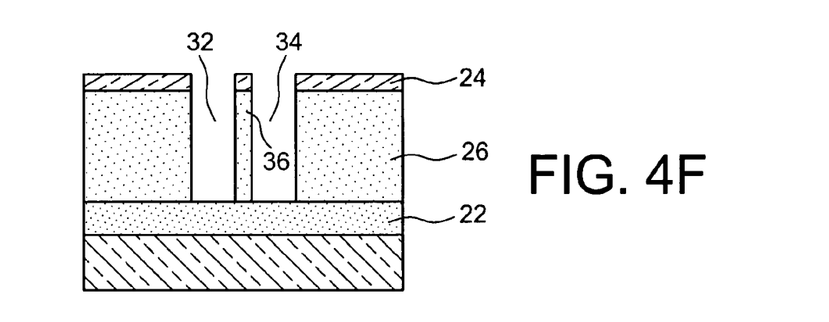
Figure 4G:
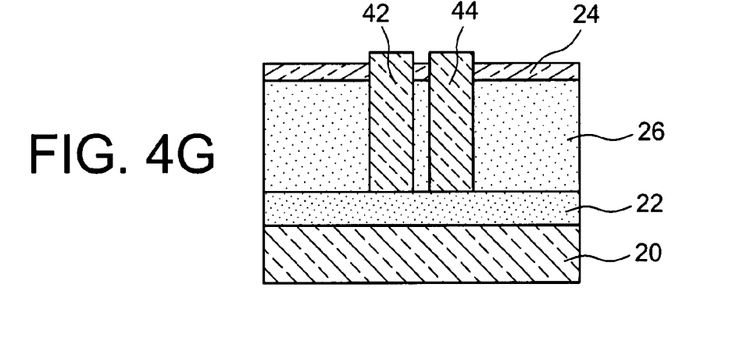
Figure 4H:
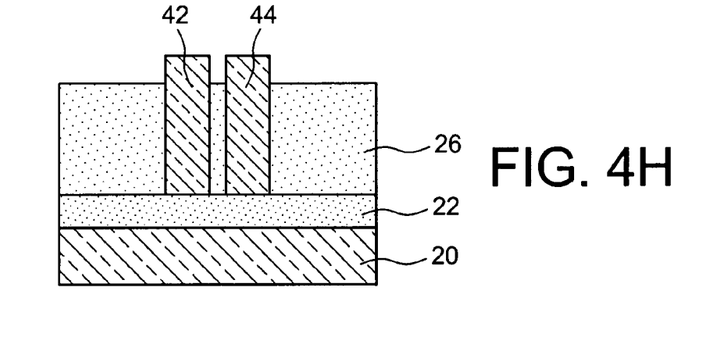

These openings enable etching of the hard mask layer 24 to be carried out (FIG. 4E). The material having a refractive index less than that of silicon can then be etched through its entire thickness, until reaching the oxide layer 22 which forms an etching barrier layer (FIG. 4F). In this way, two trenches 32, 34 were formed, separated by a material having a refractive index less than that of silicon wall 36.

Next, a deposit 42, 44 of amorphous silicon (FIG. 4G) is made in each of these two trenches.

Figure 4I:
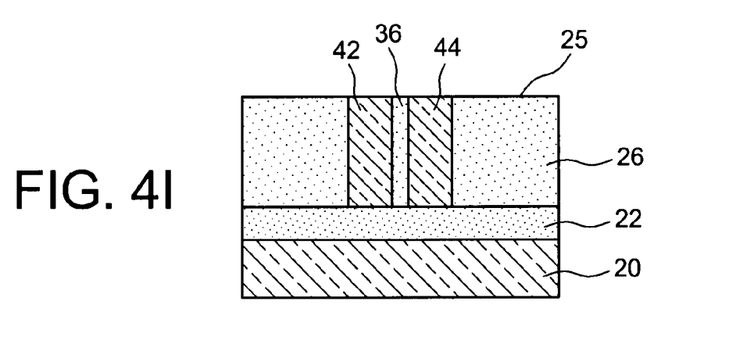

A planarization step (FIG. 4I) enables the top of the silicon deposits 42, 44 to be brought back up to the height of the surface 25 of the material having a refractive index less than that of silicon, also eliminating the hard mask.

Figure 4J:
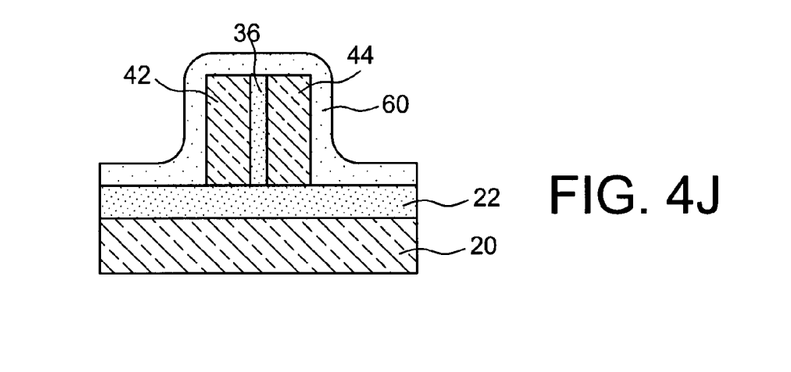

Finally (FIG. 4J), the portions of the material having a refractive index less than that of silicon which are situated on either side of the silicon deposits 42, 44 can be eliminated from the layer 26. The wall 36 is maintained, for example, by using a mask when an etching is made. There again, the layer 22 forms the barrier layer for this etching.

At the end of this step, a slotted guide remains, the slot consisting of the wall 36, which was isolated from the layer 26 during etching (FIG. 4F), said wall being flanked on either side by silicon deposits 42, 44.

Figure 6A:
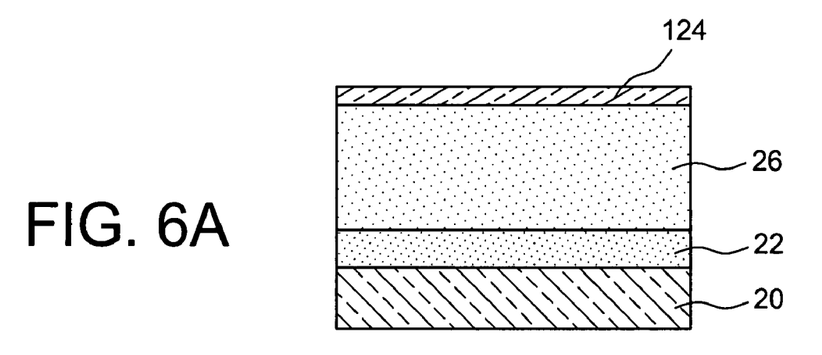
FIGS. 6A-6J and 7A-7J are alternatives of the methods of FIGS. 4A-4J and 5A-5E, respectively.
Figure 6B:
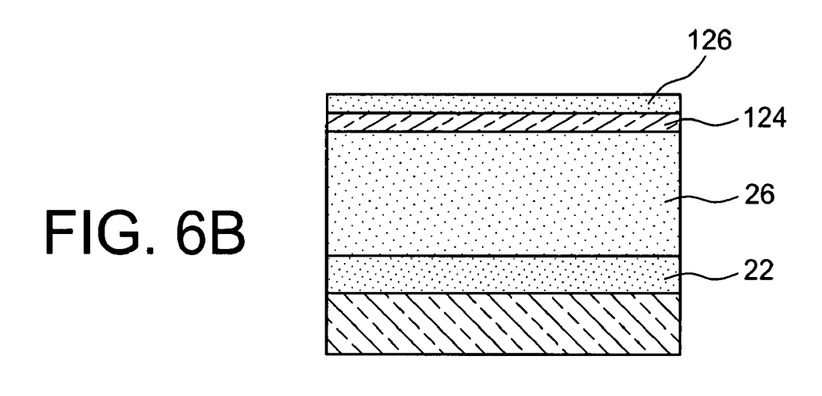
Figure 6C:
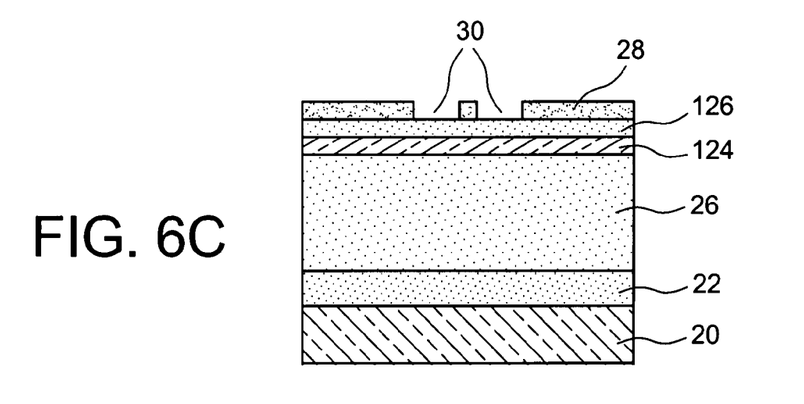
Figure 6D:
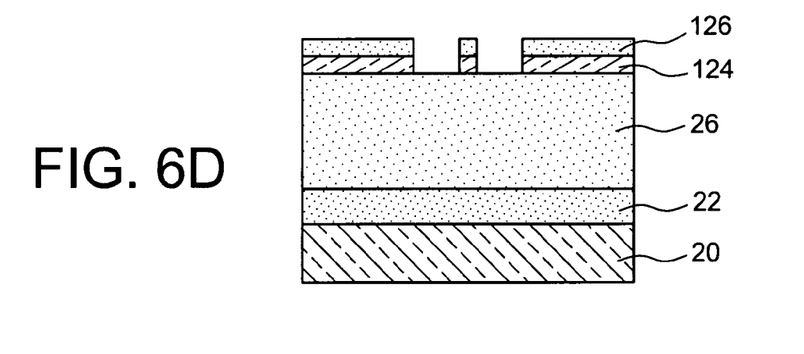
Figure 6E:
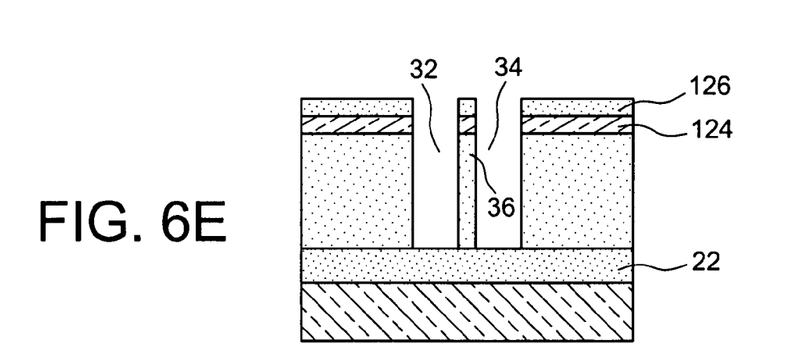

According to one alternative, shown in FIGS. 6A-6J, a silicon nitride SiN deposition 124 (FIG. 6A) can be made on the structure of FIG. 4B, followed by an amorphous carbon deposition 126 forming a hard mask (FIG. 6B). The silicon nitride 124 may serve as a barrier layer during a subsequent planarization step.

A positive photoresist 28 is then deposited. Openings 30 are formed in this resin (FIG. 6C) via lithography.

These openings enable etching of the hard mask layer 126 and of the nitride layer 124 (FIG. 6D) as far as the material having a refractive index less than that of silicon. Next, the material having a refractive index less than that of silicon can be etched through its entire thickness (FIG. 6E), until reaching the oxide layer 22, which forms an etching barrier layer. In this way, two trenches 32, 34 were formed, separated by a wall 36 of material having a refractive index less than that of silicon.

Figure 6F:
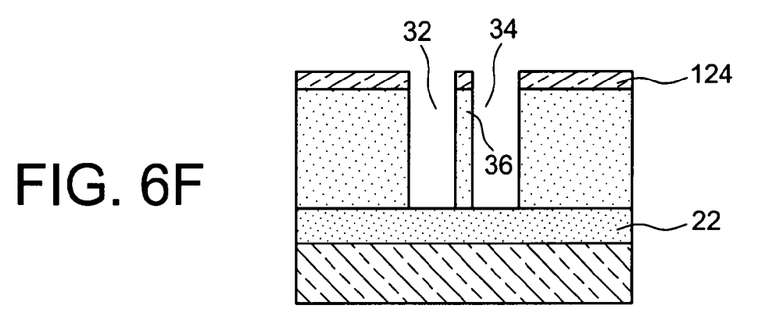

The hard mask 126 is then removed (FIG. 6F).

Figure 6G:
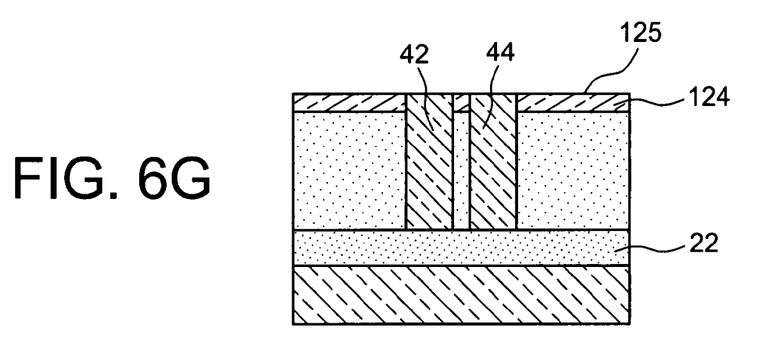

Next, a deposit 42, 44 of amorphous silicon is made in each of these two trenches. The upper surface of these deposits is brought to the height or level of the outside surface 125 of the nitride layer 124 via planarization (FIG. 6G).

Figure 6H:
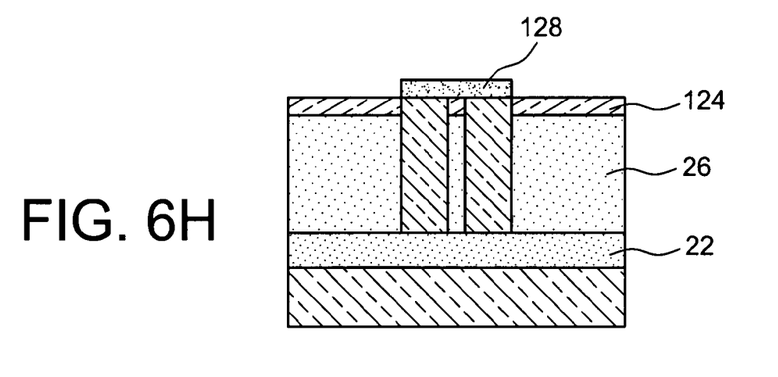
Figure 6I:
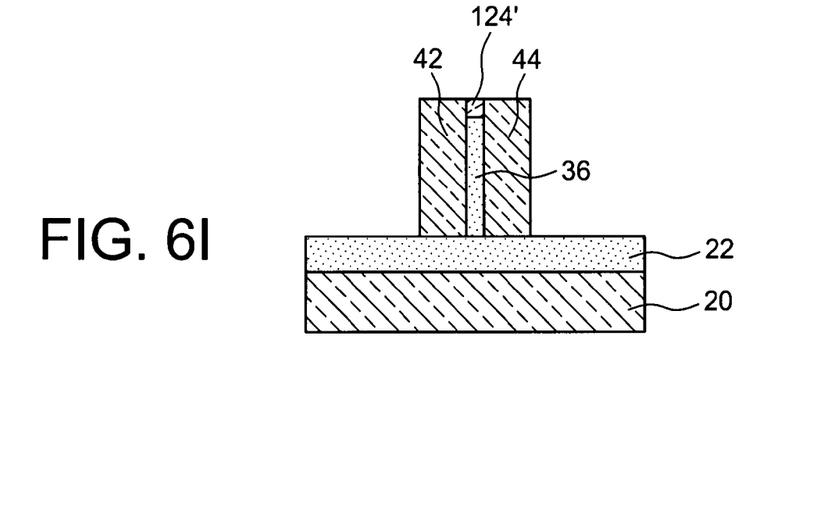
Figure 6J:
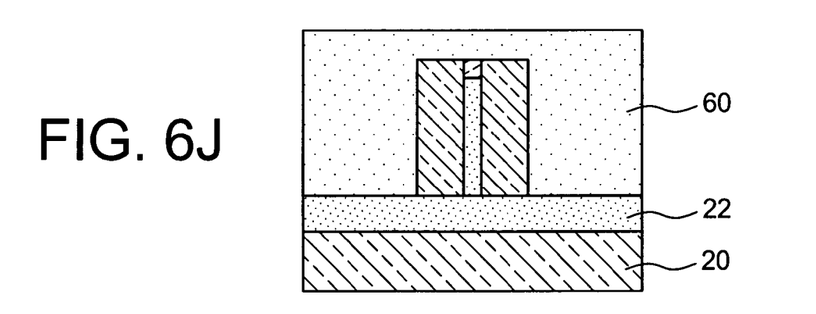

A resin 128 is then deposited. The edges are defined via lithography, for the purpose of etching the nitride layer 124 and the underlying layer 26 (FIG. 6H).

Upon completion of the etching of these latter layers, and then elimination of the resin 128 (FIG. 6I), a slotted guide remains, the latter consisting of the wall 36, which was isolated from the layer 26 during etching. This wall is flanked on either side by silicon deposits 42, 44. It is surmounted by a residue of 124' of silicon nitride SiN.

FIGS. 5A to 5E describe another embodiment, particularly suited to the case where the silicon used for filling in the trenches appears in monocrystalline form.

Figure 5A:
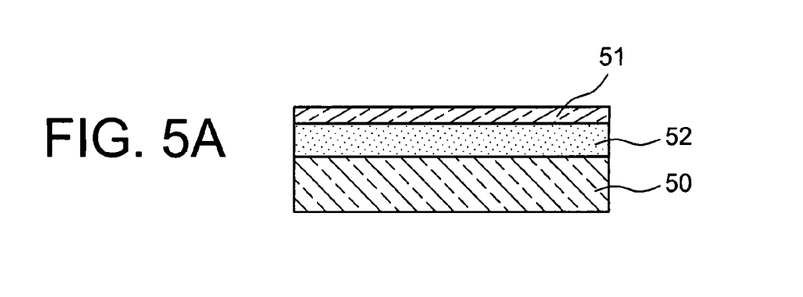
FIGS. 5A-5E are steps of a method according to the invention, using monocrystalline Si.

The starting element consists of a stack of a layer of silica 52 and a layer 51 of silicon. A stack such as this is obtained, for example, from a SOI plate, reference 50 designating a semiconductor substrate, made of silicon, for example. The layer 51 has a monocrystalline structure which makes it possible to use a starting crystal for an epitaxial step. This thin layer 51 further makes it possible to reduce the thermal dispersion induced by the light being propagated in the guide.

Figure 5B:
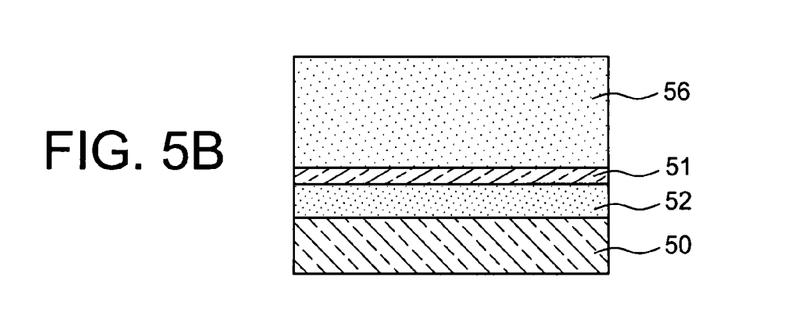

Next, a deposition 56 of material having a refractive index less than that of silicon is made (FIG. 5B).

Said material having a refractive index less than that of silicon is for example silicon dioxide SiO2 or silicon nitride SiN, or non-stoichiometric $SiO_x$ (x<2).

Figure 5C:
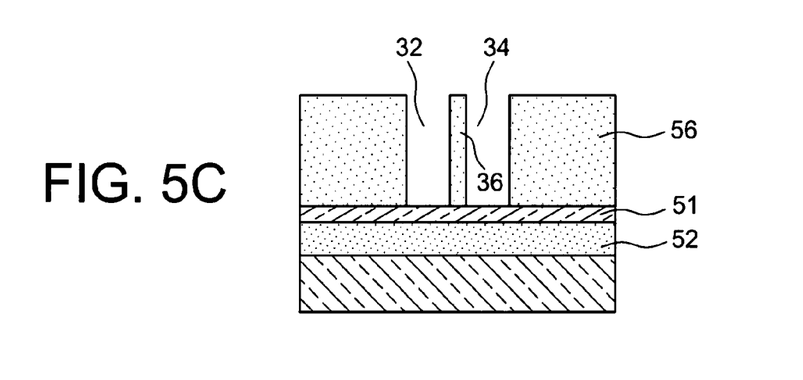
Figure 5D:
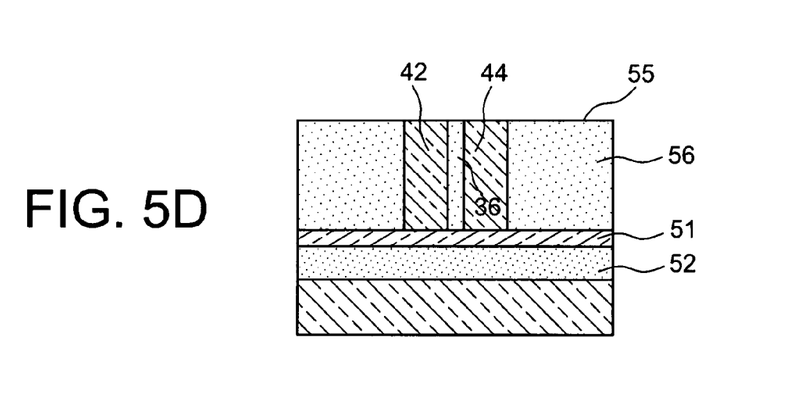

After lithography, this layer can be etched (see FIG. 5C). Thus, the structure is found again consisting of the wall 36 of material having a refractive index less than that of silicon and the two trenches 32, 34 on each side of the wall. The silicon layer 51 serves in particular as an etching barrier layer.

Monocrystalline silicon 42, 44 can next be formed via epitaxy from the silicon layer 51 in the trenches 32, 34. A planarization step enables the top of these epitaxied areas to be brought back to the level of the outside surface 55 of layer 56 (see FIG. 5D).

Figure 5E:
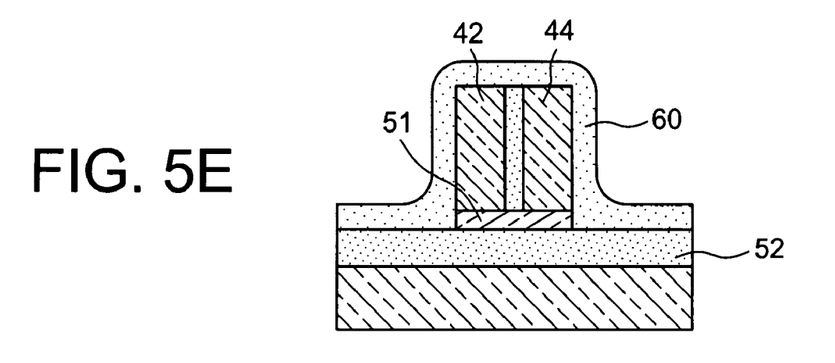

The material having a refractive index less than that of silicon on either side of the epitaxied silicon areas 42, 44 can then be eliminated, thereby leaving a slotted guide structure as shown in FIG. 5E. There again, the wall 36 remains protected during this operation, e.g., via masking.

According to an alternative shown in FIGS. 7A-7J, a silicon nitride SiN deposition 124 (FIG. 7A) can be made on the structure of FIG. 5B, followed by an amorphous carbon deposition 126 (FIG. 7B) forming a hard mask. The Material having a refractive index less than that of silicon may also have been formed via PECVD or LPCVD. The silicon nitride 124 may serve as a barrier layer during a subsequent planarization step.

A positive photoresist 28 is then deposited. Openings 30 are formed in this resin (FIG. 7C) via lithography.

These openings enable etching of the hard mask layer 126 and the nitride layer 124 (FIG. 7D) as far as the material having a refractive index less than that of silicon. Next, the material having a refractive index less than that of silicon 56 can be etched through its entire thickness (FIG. 7E), until reaching the silicon layer 51, which forms an etching barrier layer. In this way, two trenches 32, 34 were formed, separated by a wall 36 of material having a refractive index less than that of silicon.

The hard mask 126 is then removed (FIG. 7).

Figure 7A:
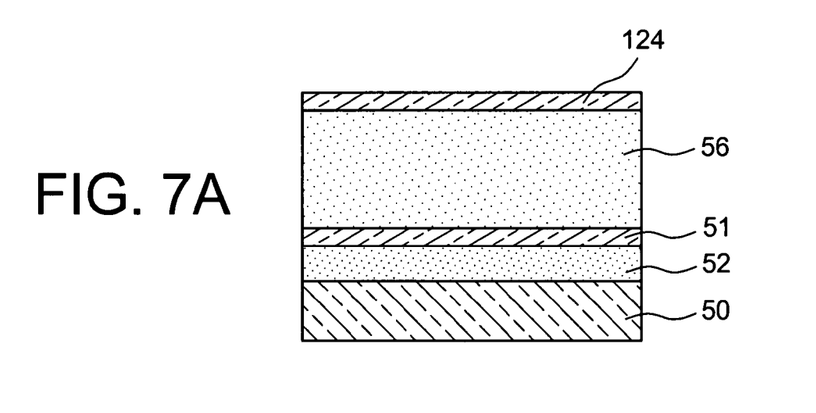
Figure 7B:
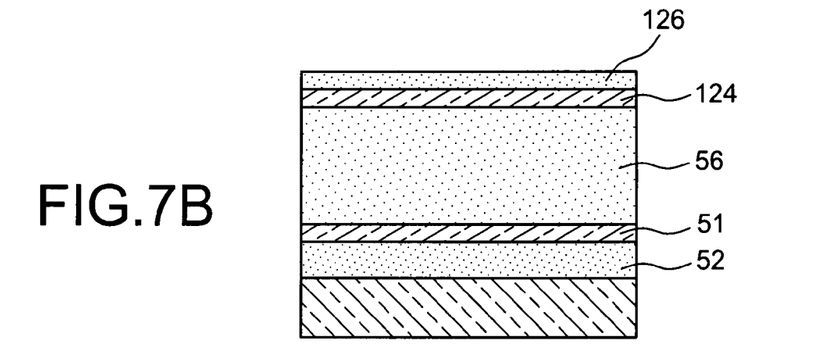
Figure 7C:
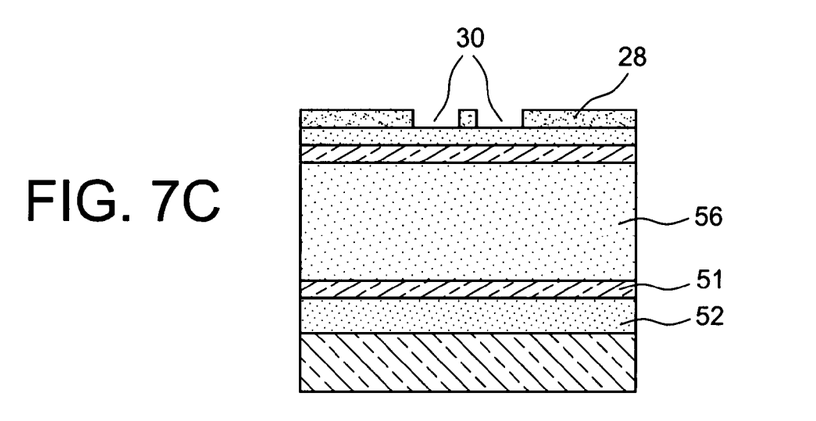
Figure 7D:
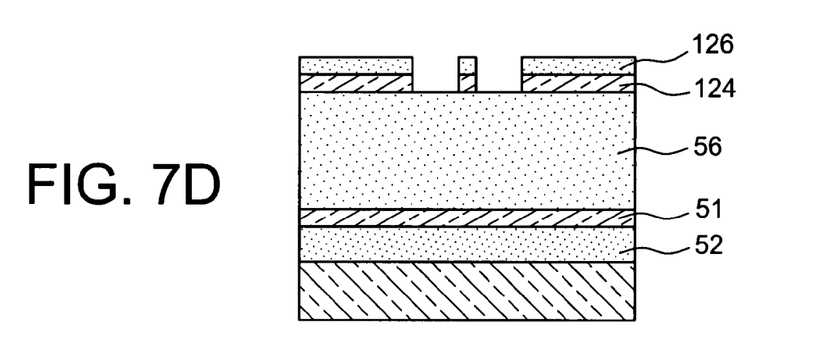
Figure 7E:
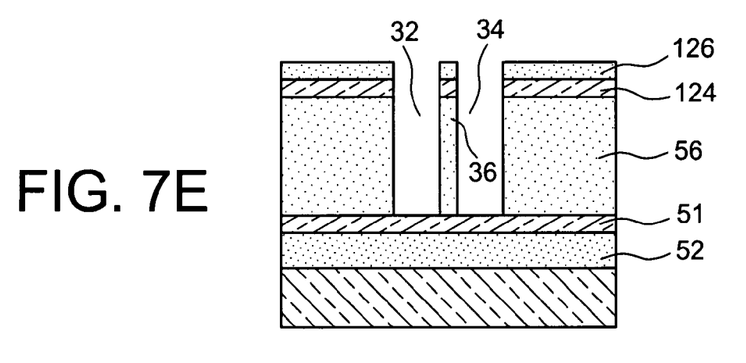
Figure 7F:
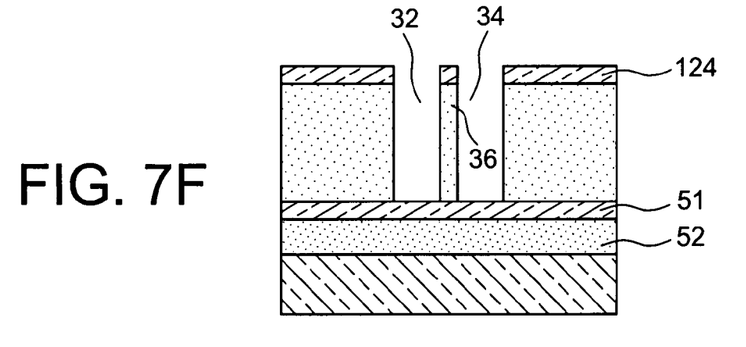
Figure 7G:
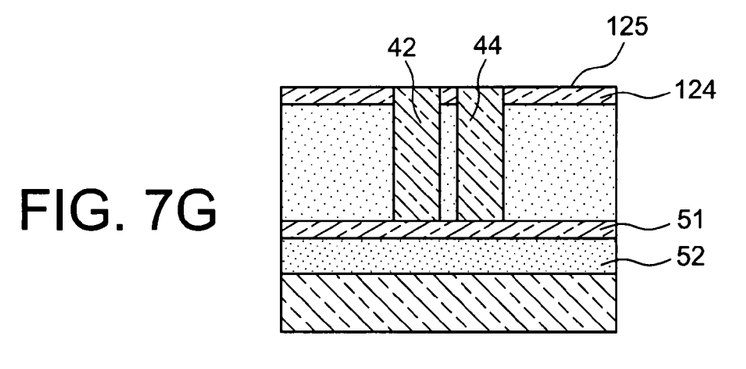

Next, monocrystalline silicon 42, 44 is produced in each of these two trenches via epitaxy. The upper surface of these depositions is brought to the height or level of the outside surface 125 of the nitride layer 124 via planarization (FIG. 7G).

Figure 7H:
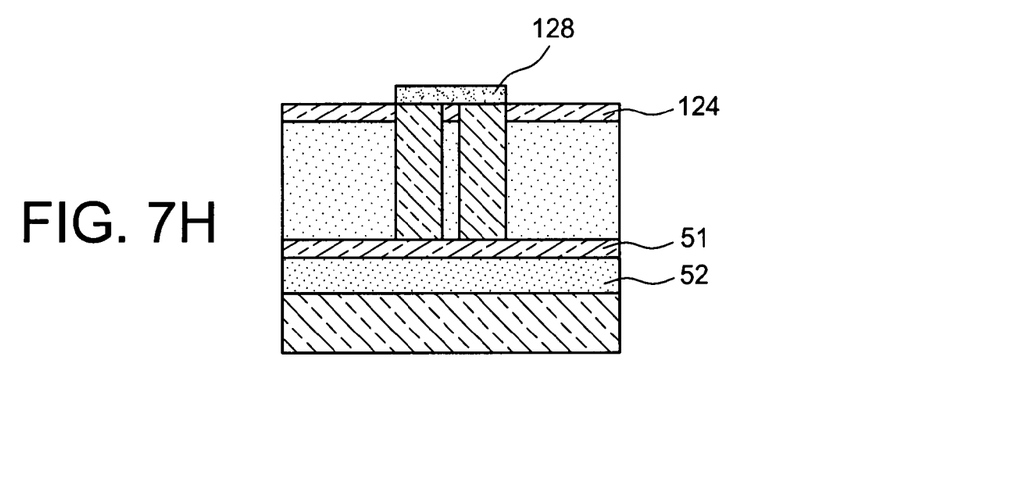
Figure 7I:
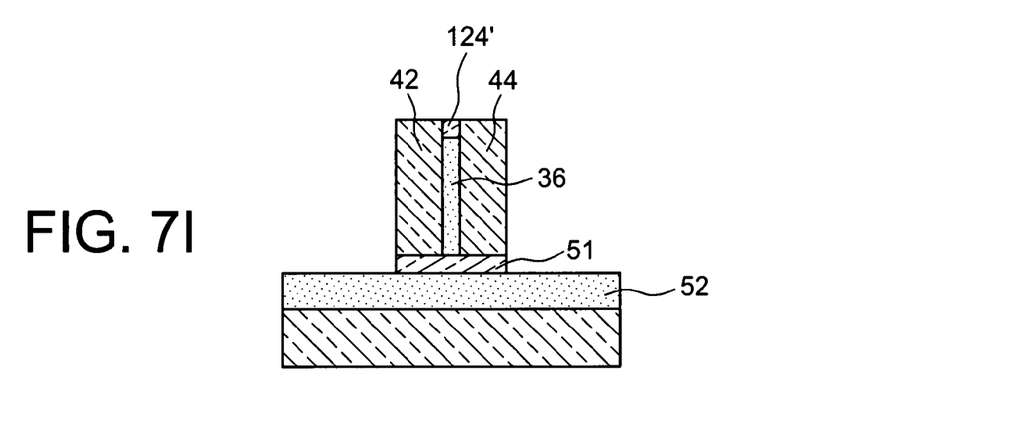
Figure 7J:
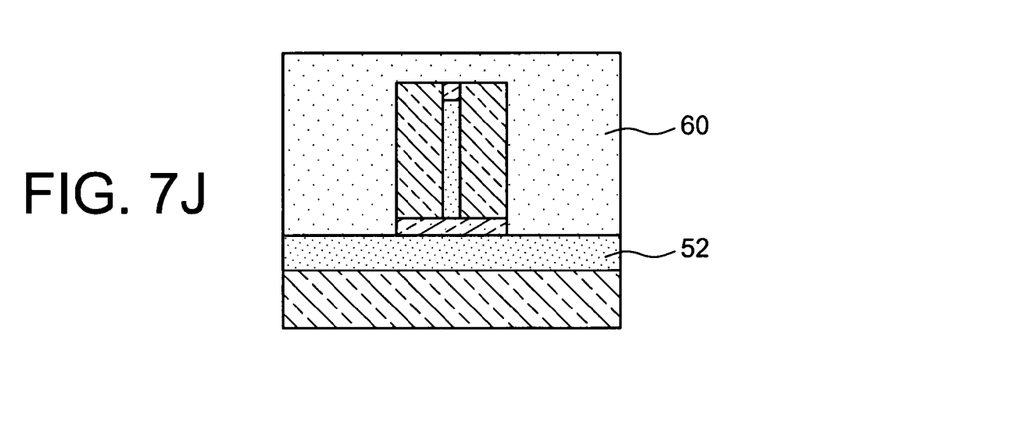

A resin 128 is then deposited. The edges are defined via lithography, for the purpose of etching the nitride layer 124 and the underlying layer 56 (FIG. 7H).

Upon completion of the etching of these latter layers, and then elimination of the resin 128 (FIG. 7I), a slotted guide remains, the latter consisting of the wall 36, which was isolated from the layer 56 during etching (step 7F), a wall which is flanked on either side by silicon depositions 42, 44, and which is surmounted by a residue 124' of silicon nitride SiN.

Whatever the embodiment, when the material having a refractive index less than that of silicon is non-stoichiometric $SiO_x$ (x<2), an annealing step of the $SiO_x$ (x<2) in order to form silicon nanocrystals can be carried out after etching of the $SiO_x$ (i.e., after the steps of FIGS. 4F, 5C, 6E, and 7F) but prior to the deposition of silicon 42, 44 in the trenches, or after this deposition of silicon 42, 44 in the trenches, but prior to the $SiO_x$ etching or after the $SiO_x$ etching (FIG. 4J, 5E, 6I, or 7I).

But, if the $SiO_x$ is deposited in particular via PECVD, its thickness diminishes during annealing. In this case, it is preferable to insert the annealing step immediately after the $SiO_x$ deposition and prior to any etching step (and in particular the step of FIGS. 4F, 5C, 6E, and 7F). Otherwise, line defects may appear between the $SiO_x$ and the Si. Furthermore, annealing has the effect of increasing the optical losses of the silicon layer.

Once the guide has been formed and etched, a $SiO_2$ cap layer 60 can be made (FIGS. 4J, 5E, 6J and 7J).

Using this technique, the slotted guide is made in the form of 3 layers 36, 42, 44 (in fact: the wall 36 and the two depositions 42, 44 made on either side of this wall) arranged perpendicular to the support substrate, either the Si substrate 20 and the layer 22 of SiO2, in the case of FIGS. 4A-4I, or 6A-6J, or the SOI in the case of FIGS. 5A-5E or 7A-7J.

The invention is particularly advantageous for a slot shape factor (as defined above in connection with FIG. 1D) greater than 1.5.

The invention applies in particular to the field of optical interconnections, to that of intra-chip optical interconnections, or else to optical telecommunications.

The invention claimed is:

1. Method for producing a slotted optical waveguide, in which:
    a) a layer of material having a refractive index less than that of silicon is formed on an etching barrier layer,
    b) two parallel trenches are etched into the layer of material having a refractive index less than that of silicon, said etching being stopped at said etching barrier layer, these two trenches being separated by a continuous wall of material having a refractive index less than that of silicon,
    c) the trenches thus made are filled with silicon, whereby an optical waveguide is created comprising said silicon and said continuous wall.

2. Method according to claim 1, the silicon which fills the trenches being in amorphous form.

3. Method according to claim 2, the silicon which fills the trenches being formed via deposition.

4. Method according to claim 2, the etching barrier layer being $SiO_2$.

5. Method according to claim 1, the silicon which fills the trenches being in monocrystalline form.

6. Method according to claim 5, the silicon which fills the trenches being formed via epitaxial growth.

7. Method according to claim 5, the etching barrier layer being made of silicon.

8. Method according to claim 7, the barrier layer being the surface layer of a SOI.

9. Method according to claim 1, the material having a refractive index less than that of silicon then being eliminated from each side of the silicon formed in the trenches on either side of the wall of material having a refractive index less than that of silicon, this wall being maintained during this elimination operation.

10. Method according to claim 1, step b) for etching the trenches being carried out with the aid of a hard mask.

11. Method according to claim 10, the hard mask being made of SiN, or of SiC, or of a resin or of a metal, or of amorphous carbon.

12. Method according to claim 1, said material having a refractive index less than that of silicon being silicon dioxide $SiO_2$, or silicon nitride SiN, or non-stoichiometric $SiO_x$ (x<2).

13. Method according to claim 1, said material having a refractive index less than that of silicon being non-stoichiometric $SiO_x$ (x<2), said method further comprising a step of:
    d) annealing said non-stoichiometric $SiO_x$ after step a) or b) or c).

14. Method according to claim 13, said step d) of annealing being carried out after the non-stoichiometric $SiO_x$ forming step a) and prior to step b) for etching the trenches.

15. Method according to claim 1, further comprising a planarization step of the silicon with which the trenches are filled.

16. Method according to claim 1, further comprising a forming step of a planarization stopping layer on said layer of material having a refractive index less than that of silicon.

17. Method according to claim 16, said planarization stopping layer being made of SiN.

18. Method for producing a slotted optical waveguide, in which:
    a) a non-stoichiometric layer of $SiO_x$ (x<2), is formed on an etching barrier layer,
    b) two parallel trenches are etched into the non-stoichiometric layer of $SiO_x$ (x<2), said etching being stopped at said etching barrier layer, these two trenches being separated by a continuous wall of non-stoichiometric $SiO_x$ (x<2),
    c) the trenches thus made are filled with monocrystalline silicon, whereby an optical waveguide is created comprising said monocrystalline silicon and said continuous wall.

19. Method for producing a slotted optical waveguide, in which:
    a) a non-stoichiometric layer of $SiO_x$ (x<2), is formed on an etching barrier layer,
    b) a step for annealing the non-stoichiometric layer of $SiO_x$ (x<2) is carried out after said $SiO_x$-forming step a) and prior to step c)
    c) two parallel trenches are etched into the non-stoichiometric layer of $SiO_x$ (x<2), said etching being stopped at said etching barrier layer, these two trenches being separated by a continuous wall of non-stoichiometric $SiO_x$ (x<2),
    d) the trenches thus made are filled with monocrystalline silicon, whereby an optical waveguide is created comprising said monocrystalline silicon and said continuous wall.

20. Method for producing a slotted optical waveguide, in which:
    a) a non-stoichiometric layer of $SiO_x$ (x<2) is formed on an etching barrier layer, said etching barrier layer being a silicon surface layer of a SOI,
    b) a step for annealing the non-stoichiometric layer of $SiO_x$ (x<2) is carried out after said $SiO_x$-forming step a) and prior to step c)
    c) two parallel trenches are etched into the non-stoichiometric layer of $SiO_x$ (x<2), said etching being stopped at said etching barrier layer, these two trenches being separated by a continuous wall of non-stoichiometric $SiO_x$ (x<2),
d) the trenches thus made are filled with monocrystalline silicon, whereby an optical waveguide is created comprising said monocrystalline silicon and said continuous wall.

21. Method according to claim 20, the silicon which fills the trenches being formed via epitaxial growth.

22. Method according to claim 21, the $SiO_x$ then being eliminated from each side of the silicon formed in the trenches on either side of the $SiO_x$ wall, this wall being maintained during this elimination operation.

* * * * *